United States Patent [19]

Rawlings et al.

[11] Patent Number: 5,309,379
[45] Date of Patent: May 3, 1994

[54] MONITORING

[75] Inventors: Keith C. Rawlings; Roger C. Witcomb, both of Cheltenham, England

[73] Assignee: Smiths Industries Public Limited Company, London, England

[21] Appl. No.: 663,855

[22] PCT Filed: Jan. 18, 1990

[86] PCT No.: PCT/GB90/00076
§ 371 Date: Mar. 11, 1991
§ 102(e) Date: Mar. 11, 1991

[87] PCT Pub. No.: WO90/09644
PCT Pub. Date: Aug. 23, 1990

[30] Foreign Application Priority Data

Feb. 7, 1989 [GB] United Kingdom ............... 8902645

[51] Int. Cl.⁵ .............................................. G06F 15/60
[52] U.S. Cl. ................................. 364/578; 364/424.06; 364/551.01; 364/151
[58] Field of Search ............ 364/578, 551.01, 508, 364/431.02, 424.06, 148, 149, 151; 395/913, 914, 920

[56] References Cited

U.S. PATENT DOCUMENTS

| | | | |
|---|---|---|---|
| H1006 | 12/1991 | Zwicke | 364/551.01 |
| 4,184,205 | 1/1980 | Morrow | 364/508 |
| 4,215,412 | 7/1980 | Bernier et al. | 364/551.01 |
| 4,336,595 | 6/1982 | Adams et al. | 364/508 |
| 4,785,403 | 11/1988 | Kuhlberg | 364/424.06 |
| 4,837,695 | 6/1989 | Baldwin | 364/551.01 |
| 4,912,661 | 3/1990 | Pottor | 364/550 |
| 5,070,458 | 12/1991 | Gilmore et al. | 364/424.06 |
| 5,105,372 | 4/1992 | Provost et al. | 364/551.01 |

Primary Examiner—Kevin J. Teska
Assistant Examiner—Ellis B. Ramirez
Attorney, Agent, or Firm—Pollock, VandeSande and Priddy

[57] ABSTRACT

The operation of an engine or other assembly is monitored by detecting the sound it makes and deriving from this, in conjunction with its speed, temperature and control settings, a multi-dimension condition vector. The vector changes during operation of the engine and is supplied to a processor which continuously builds a model of the engine at different stages of operation such as by a sequence-learning neural net or by hidden markov model when an atypical condition vector is received, the processor generates an alert signal to a display.

10 Claims, 2 Drawing Sheets

MONITORING

This invention relates to monitoring.

BACKGROUND OF THE INVENTION

The invention is more particularly concerned with methods and apparatus for monitoring the condition of assemblies such as a gas-turbine engine in an aircraft.

It is known to monitor the vibration produced by engines and bearings and to detect when certain frequencies of the vibration exceed a predetermined level so as to establish when wear or damage has been produced. This can be a useful technique but is only capable of detecting significant amounts of wear or damage. This is because the vibration spectrum produced by the engine or bearing varies normally according to its operational condition such as speed, temperature, loading and so on. The amplitude above which one frequency of vibration will trigger a wear or damage signal must be sufficiently high that it is not triggered at the maximum amplitude experienced in normal use. This makes the apparatus relatively insensitive to incipient damage. Furthermore, although previous systems relying on the detection of spectral peaks can be used to identify known faults which cause spectral peaks at predictable frequencies, they are not capable of responding to more subtle spectral variations, such as distortion not involving sharp peaks, or unusual combinations of peaks, or unusual sequences. The response of previous systems is therefore severely limited as far as incipient or hitherto unknown fault conditions are concerned.

SUMMARY OF THE INVENTION

It is an object of the present invention to provide monitoring methods of improved sensitivity.

According to the present invention there is provided a method of monitoring the condition of an assembly including the steps of deriving signals representative of the condition of the assembly, continuously building a model of the assembly at different stages of use through the life of the assembly such that the model is modified by any ageing of the assembly, and detecting the amount of deviation of the condition of the assembly from the model of the assembly.

Where the method is used to monitor the condition of a sound-generating assembly, the step of deriving signals representative of the condition of the assembly includes monitoring the acoustic spectrum of the assembly such that the model includes information about the acoustic spectrum of the assembly at different stages of use through the life of the assembly. The acoustic spectrum is preferably the acoustic spectrum transmitted through air, and the acoustic spectrum is monitored with a microphone.

The assembly may be an engine such as a gas-turbine engine. The step of deriving signals representative of the condition of the assembly may include monitoring the speed of the engine.

A multi-dimension vector may be established in respect of the condition of the assembly. The model of the assembly may be built using a sequence-learning neural net or a hidden Markov model.

A model may be built of a first assembly, this model being utilized on a second assembly of the same kind as the first assembly, and the model being modified by operation of the second assembly.

BRIEF DESCRIPTION OF THE DRAWINGS

An engine monitoring apparatus and method, in accordance with the present invention, will now be described, by way of example with reference to the accompanying drawings, in which.

DESCRIPTION OF THE PREFERRED EMBODIMENTS

Figure 1:
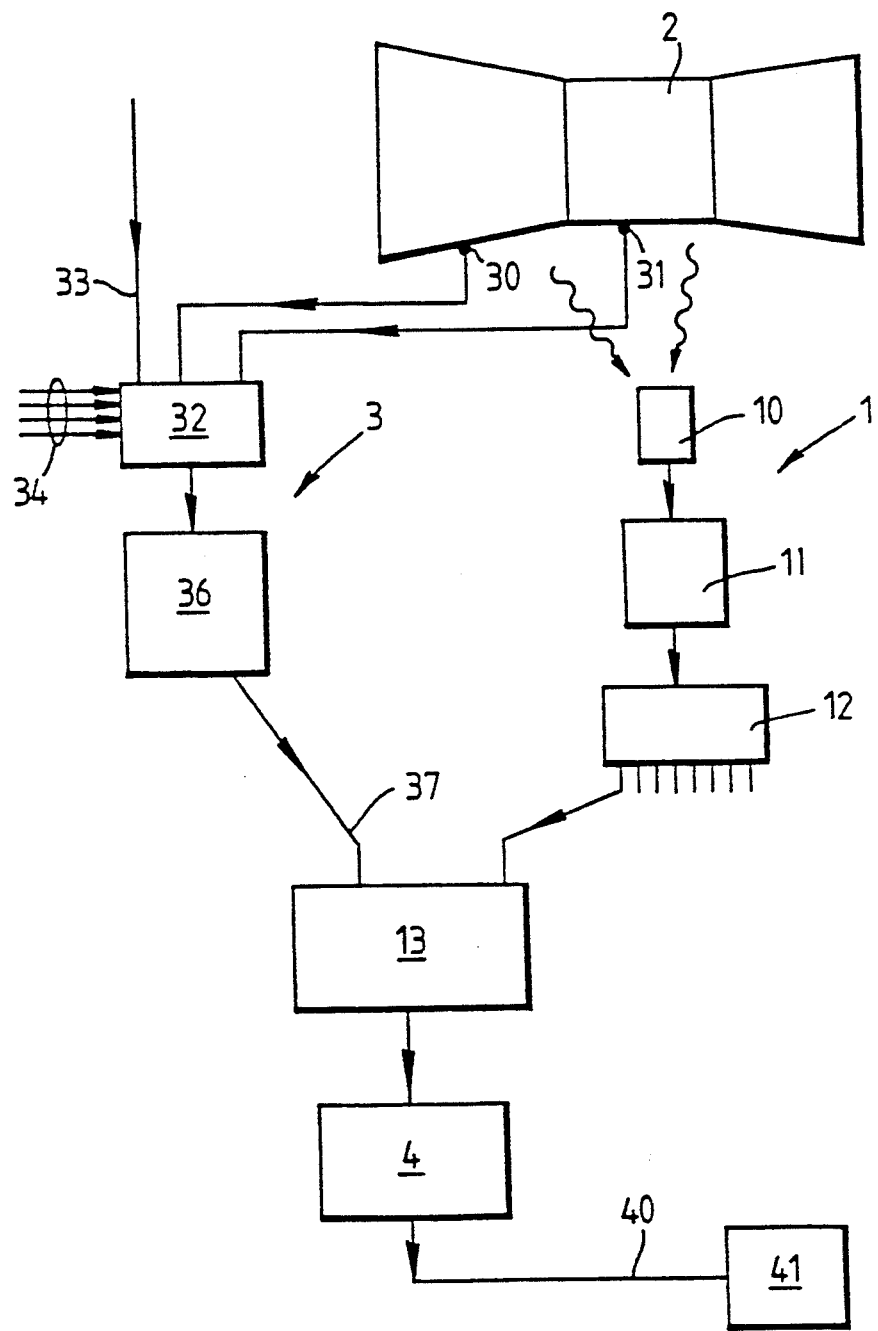
FIG. 1 shows the apparatus schematically.

The monitoring apparatus comprises a first acoustic channel 1 responsive to the sound generated by a gas-turbine engine 2 and a second channel 3 responsive to the operational condition of the engine. The two channels 1 and 3 together produce a condition vector output which is compared in a processor 4 with a model of the engine built up from previous operation of that engine.

The acoustic channel 1 includes a microphone 10 which is responsive to the airborne sound generated by the engine 2 in operation. The microphone 10 is not necessarily responsive to sound within the range of human hearing but typically will have a frequency response beyond about 100KHz. The electrical output from the microphone 10 is supplied to a digitizing unit 11 which supplies a digitized output to a spectrum analyzer 12 of conventional construction which produces time-averaged signals for each of several different bands. Typically the spectrum analyzer 12 produces 64 parallel outputs at different freqencies each with a width of 1 KHz and with time averaging over 0.2 seconds. The outputs from the analyzer 12 are supplied to a processing unit 13 which also receives a second input from the second channel 3.

The second channel 3 includes an engine spool speed sensor 30 and a exhaust gas temperature sensor 31 which supply output signals in response to these operational conditions of the engine 2 to an analogue-to-digital converter 32. The converter 32 also receives inputs on line 33 representative of the throttle or other engine control settings which indicate the desired thrust of the engine. The throttle and any other active, that is, pilot-imposed, control are the most important non-acoustic parameters because the apparatus will learn to associate certain response sequences with imposed control sequences and so build up its own internal sequence monitor, signalling when an unexpected sequence occurs. Signals representing aircraft performance, such as its attitude, airspeed or the like are supplied on lines 34 to the converter 32. Various other flight data could be supplied to the converter 32. The output of the converter 32 is supplied to a processor 36 which produces a multi-dimensional vector signal representative of the stage of operation of the engine 2. This vector signal is supplied via line 37 as the second input of the processing unit 13. The processing unit 13 produces a combined N-dimensional engine condition vector from the two inputs and supplies this to one input of the processor 4.

The processor 4 preferably operates through self-learning techniques, such as involving a sequence-learning, time-aware, neural net of the multi-layer perceptron variety or a hidden Markov model similar to that used in speech recognition.

The first time that the engine is operated in flight, the processor 4 builds up a model of the engine's operation during all stages of that flight from the engine condition vector. Repeated operation of the engine modifies this model to build up an average or typical model of the engine's operation. The system gradually becomes familiar with the engine's acoustic behavior in the engine's own environment and during the engine's day-today operation. The model will be modified as the engine ages. Sounds caused by interaction between the engine and airframe form a part of this acoustic model and do not need to be identified or filtered out.

When an atypical engine condition vector is received by the processor 4, this causes the processor to generate an alert signal which is supplied via line 40 to a display 41 or other utilization device such as a recorder or engine control unit. The alert signal preferably indicates the degree of departure of the engine condition vector from the model, such as in the form of a probability that the condition vector is a realization of the statistically typical behavior. If the model takes the form of a sequence-recognizing neural network, the network will act as a 'novelty filter' and indicate an unknown input sequence. If the model is a Markov model, a potential fault condition will be assigned an increasing severity level as the actual sequence becomes a lower probability realization of the Markov representation. The information is used to alert ground maintenance staff of deviations from normal operation which should be investigated, or to alert the pilot of more serious emergencies. This system does not, therefore, just trigger an alarm on exceeding a threshold but raises signals of varying degrees of urgency from mild disquiet to major emergency according to whether its input is a minor deviation or a gross deviation from what it has come to understand as normal. A minor deviation would accummulate into a major one if it were persistent but would be forgotten if it were momentary. The nature of the deviation is self learned by the system and is not programmed by humans. In addition to discerning commonality within and between the states of the engine, because the apparatus is time-aware, it is able to familiarize itself with the sequences in which state transitions occur in the engine or other assembly.

In some cases it may be preferred to store a model of the engine's operation derived from operation of a different but same type of engine at the start of operation of the monitoring system. Alternatively, the system could start without any model, and a preliminary model be established on the first occasion that the engine is operated. It will be appreciated that during the earliest flights, the reporting of unusual conditions will be unreliable but will become increasingly discerning and useful after several flights when it will have accumulated knowledge in the form of a set of neural network synaptic strengths and biasses or a Markov model in a manner analogous to that of a speech recognizer.

Prior to operation, it is necessary to monitor the acoustic spectrum produced by the engine, or by a different engine of the same type, in normal operation and at different stages of operation. By repeating this procedure in different conditions, a statistical representation of the normal operational behavior of the engine is established. Various techniques used in pattern recognition and speech recognition could be used to build up a model of the acoustic spectrum of the engine at different stages of operation, such as by Markov modelling or neural networks.

Figure 2:
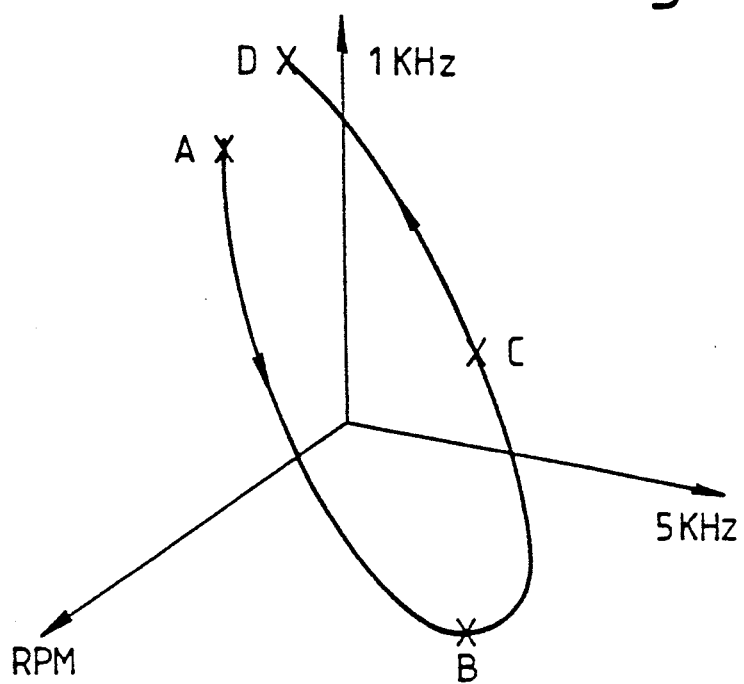
FIGS. 2 and 3 are graphs illustrating the change in acoustic spectrum.

With reference to FIG. 2 there is shown a highly simplified representation of the way in which the amplitude of acoustic energy at two different frequencies 1KHz and 5KHz varies with engine speed in revolutions per minute. The locus A to B represents the stage of taxiing along a runaway to maximum rpm at take-off at the point B. The point C indicates the aircraft cruise condition for most of the flight. The processor 4 contains a model of this but in a more complex form with a greater number of frequencies and other engine functions in addition to engine speed.

While the aircraft follows the locus A to D to within a predetermined range, the input to the processor 4 will be closely similar to the stored model and no output indicating departure from the model will be produced.

Figure 3:
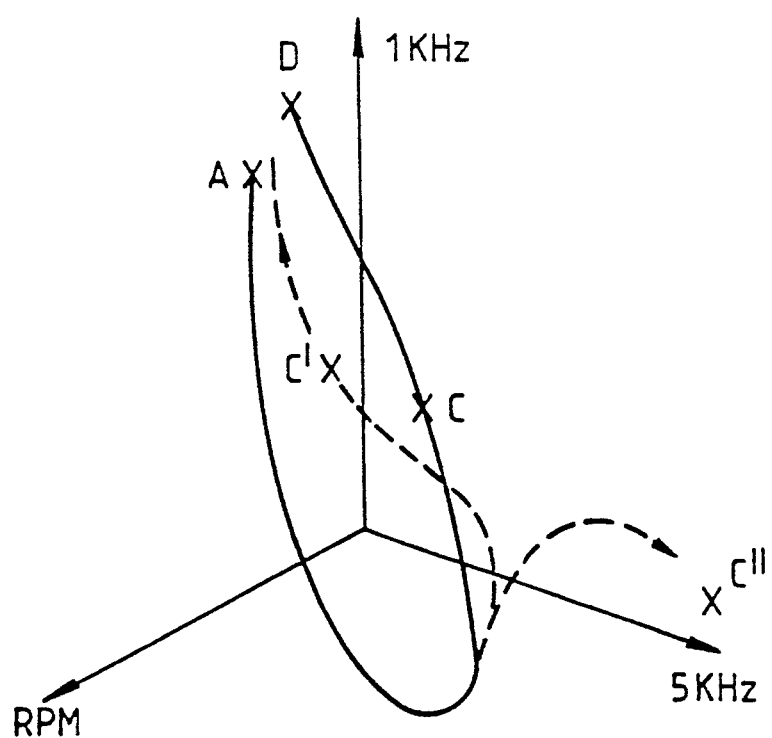

With reference now to FIG. 3, there is illustrated an irregular and an abnormal engine performance. The point C' represents an unusual cruise state on an unusual trajectory through the normal states and this would cause the processor 4 to produce an alert signal on line 40 to the display 41. The point C" represents a very abnormal state on an abnormal trajectory and would cause the processor 4 to produce an urgent alarm signal on line 40 to the display 41.

The monitor apparatus of the present invention can be very sensitive because it will respond to acoustic spectra of the engine which may be unusual at, for example, low speed but may be within the normal spectrum at high speed. In this way it may be possible to detect incipient damage to the engine before failure occurs. In its simplest embodiment the apparatus only gives an indication that there is some departure from normal operation. The apparatus could, however, have diagnostic capabilities. A database of unusual deviations could be matched with known faults after some operational experience. This would become more detailed as greater operational experience is built up, the apparatus gradually being able to identify a greater number of specific likely faults. Instead of detecting airborne sound, the invention can be used with acoustic energy including vibration transmitted through solid structures.

If the apparatus has learned the environment and individual characteristics of one engine and is then transferred to another engine of the same type this could result in non-fault deviations from the learned behavior patterns which would be signalled to the maintenance engineers. Similarly, if the engine is serviced or repaired, or if there is a change in microphone position or the like, this could produce deviations from the model. Subsequent operation of the engine will cause the apparatus to acclimatize soon to the new characteristics which will be seen as normal. The signalling of temporary deviations to maintenance engineers could be a useful part of building up a diagnostic database. Longer term changes will be assimilated into the model as they happen and will not lead to any signalling of departure from normal operation. Major or abrupt deviations will not occur often enough to be accepted as normal and always signal an alert at a suitable level.

The invention is not confined to use with engines but could be used with other sound-generating equipment such as bearings, machine tools, automated assembly equipment and production lines.

The invention could also have application with other assemblies, involving any complex massively parallel data which need not be acoustic. For example, a number of thermal sensors could be placed around an engine and a self-organizing neural net detecting trends in their combined readings could be used to signal unusual behavior. Alternatively, strain gauges around an airframe, or similar assembly, could be subject to initial analysis by self-organizing neural networks with possible early warning of excessive structural stress. The strain gauge could be provided by optical fibres embedded in composite material in such a way that strain causes attenuation or reflection of radiation passing along the fibre, at the location of the strain. These front-end neural nets could pass their findings to a central processor with sufficient intelligence to signal irregularities in any aspect of the monitored assembly.

We claim:

1. A method of monitoring the condition of a sound-generating assembly characterized in that the method includes the steps of deriving signals representative of the condition of the assembly, continuously building a model of the assembly at different stages of use through the life of the assembly such that the model is continuously modified by any ageing of the assembly, and detecting the amount of deviation of the current condition of the assembly from the aged model of the assembly, said step of deriving signals including using a microphone to monitor the acoustic spectrum of the assembly transmitted through air such that the model includes information about the acoustic spectrum of the assembly at different stages of use through the life of the assembly.

2. A method of monitoring the condition of an engine characterized in that the method includes the steps of deriving signals representative of the condition of the engine, continuously building a model of the engine at different stages of use through the life of the engine such that the model is continuously modified by any ageing of the engine, and detecting the amount of deviation of the current condition of the engine from the aged model of the engine.

3. A method of monitoring the condition of an assembly characterized in that the method includes the steps of deriving signals representative of the condition of the assembly, continuously building a model of the assembly at different stages of use through the life of the assembly such that the model is continuously modified by any ageing of the assembly, establishing a multi-dimension vector in respect of the condition of the assembly, and detecting the amount of deviation of the current condition of the assembly from the aged model of the assembly.

4. A method of monitoring the condition of an assembly characterized in that the method includes the steps of deriving signals representative of the condition of the assembly, using a sequence-learning neural net to continuously build a model of the assembly at different stages of use through the life of the assembly such that the model is continuously modified by any ageing of the assembly, and detecting the amount of deviation of the current condition of the assembly from the aged model of the assembly.

5. A method of monitoring the condition of an assembly characterized in that the method includes the steps of deriving signals representative of the condition of the assembly, using a hidden Markov model to continuously build a model of the assembly at different stages of use through the life of the assembly such that the model is continuously modified by any ageing of the assembly, and detecting the amount of deviation of the current condition of the assembly from the aged model of the assembly.

6. A method of monitoring the condition of an assembly characterized in that the method includes the steps of building a model of a first assembly, utilizing said model on a second assembly of the same kind as said first assembly, deriving signals representative of the condition of the second assembly, modifying the model of the assembly at different stages of use through the life of the second assembly such that the model is continuously modified by any ageing of the second assembly, and detecting the amount of deviation of the current condition of the second assembly from the aged model of the assembly.

7. A method of monitoring the condition of a sound-generating assembly according to any one of claims 3, 4, 5, or 6 wherein the step of deriving signals representative of the condition of the assembly includes monitoring the acoustic spectrum of the assembly such that the model includes information about the acoustic spectrum of the assembly at different stages of use through the life of the assembly.

8. A method according to claim 7 wherein the acoustic spectrum is the acoustic spectrum transmitted through air, and the acoustic spectrum is monitored with a microphone.

9. A method according to claim 2 wherein the engine is a gas-turbine engine.

10. A method according to claim 2 or 5 wherein the step of deriving signals representative of the condition of the assembly includes monitoring the speed of the engine.

* * * * *